3,567,494

PROCESS FOR PREPARING POLYMERIZED SURFACE COATINGS USING ULTRA-VIOLET RADIATION

Chester W. Fitko, Chicago, Ill., assignor to Continental Can Company, Inc., New York, N.Y.

No Drawing Filed Aug. 29, 1968, Ser. No. 756,322
Int. Cl. B44d *1/50*
U.S. Cl. 117—93.31 10 Claims

ABSTRACT OF THE DISCLOSURE

A process for coating an article wherein there is applied to the surface of the article to be coated a thin film of a polymerizable acrylic ester prepared by the coesterification of a polyhydric alcohol having at least 3 esterifiable hydroxyl groups on adjacent carbon atoms with acrylic acid, and a dicarboxylic acid selected from a saturated aliphatic dicarboxylic acid and an alpha-unsaturated, alpha,beta-dicarboxylic acid, from 45% to 95% of the hydroxyl groups of the alcohol being esterified with the acrylic acid, 5% to 55% of the hydroxyl groups being esterified with the dicarboxylic acid, and exposing the polymerizable film-containing surface to a source of ultra-violet radiation for a time sufficient to effect polymerization of the acrylic ester film.

BACKGROUND OF INVENTION

(1) Field of invention

This invention is related to the coating of substrates, such as metal, paper, plastic and the like, and more particularly, to organic coatings prepared by polymerizing unsaturated polymeric materials on an article substrate surface using ultra-violet radiation.

(2) The prior art

In the manufacture of containers from metal sheet, a protective organic coating is applied to the side of the metal sheet which is to form the interior and/or exterior of the container. The materials which are employed for coating the metal sheet are generally heat-curable resinous materials which are applied in the form of a solution or dispersion in a volatile organic solvent. The wet-coated metal surface is passed through an oven in which hot air is circulated to evaporate the solvent and to cure the coating material to the required hardness. As this form of coating application is relatively slow, the art is continually seeking more rapid methods of increasing the speed of coating application.

Among the various methods which have been proposed to increase the speeds at which metal sheet can be coated is to apply a layer of suitable thickness of an unsaturated monomer or mixture of monomers to the metal sheet surface whereupon the monomer layer is activated to react and form a cured polymer coating by exposing the layer to a source of ultra-violet radiation. The activation is carried out at ambient temperatures, and since the action of the ultra-violet radiation is extremely rapid, the monomer layer can be polymerized in a continuous flow movement across the source of irradiation. Since no evaporation of solvent is required, polymeric coatings are obtained in relatively short periods of time.

Although a wide variety of unsaturated monomeric compounds have been proposed for use in forming polymeric coatings using ultra-violet curing procedures, these compounds, when exposed to an ultra-violet source, do not always form hard, adherent, solvent-resistant coatings of the type which are required for coating articles.

SUMMARY OF THE INVENTION

In accordance with the present invention, there is provided a rapid method of preparing clear, colorless, hard, solvent-resistant adherent polymeric coatings on solid substrates, such as metal, paper, plastic and the like, wherein there is applied to the substrate a thin film of a polymerizable ester prepared by the co-condensation of acrylic acid and a dicarboxylic acid selected from alpha-unsaturated, alpha,beta-dicarboxylic acids having 4 to 5 carbon atoms, and saturated aliphatic dicarboxylic acids having 3 to 12 carbon atoms with a polyhydric alcohol having at least 3 esterifiable hydroxyl groups on adjacent carbon atoms, 45% to 95% of the hydroxyl groups being esterified with the acrylic acid, and 5% to 55% of the hydroxyl groups being esterified with the dicarboxylic acid. The polymerizable ester-coated side of the substrate is exposed to a source of ultra-violet light for a time sufficient to effect the polymerization of the ester and to convert the ester into a hard, continuous adherent coating on the substrate.

The process of the present invention eliminates the high cost and time of the oven-baking cycle which is currently used for producing metal surface coatings. The polymerized coating prepared by the process of the present invention contains no residual catalysts or other foreign substances enabling the coating to readily meet the purity standards required of coatings in the container field.

PREFERRED EMBODIMENTS

The polyhydric alcohols which are employed in the practice of the present invention contain 3 to 6 hydroxyl groups. It is a critical and essential feature of the present invention that the polyhydric alcohol contain at least 3 hydroxyl groups and that the hydroxyl groups be attached to adjacent carbon atoms of the alcohol. As will hereinafter be illustrated, if the polyhydric alcohol contains less than 3 carbon atoms, or if the hydroxyl groups of the polyhydric alcohol are not attached to adjacent carbon atoms, the polymerizable ester of the present invention will either cure very slowly or not at all when exposed to ultra-violet radiation.

Examples of polyhydric alcohols which may be reacted with acrylic acid and the dicarboxylic acid to prepare the polymerizable esters useful in the practice of the present invention include glycerol, erythritol, arabitol, sorbitol, mannitol, and dulcitol.

It is also a critical feature of the invention that at least 45% of the hydroxyl groups of the polyhydric alcohol are esterified with acrylic acid. If less than 45% of the hydroxyl groups are esterified with acrylic acid, the polymerization rate of the ester is materially slackened.

It is a further critical feature of the invention that the polyhydric alcohol be co-reacted with an alpha-unsaturated alpha,beta-dicarboxylic acid or anhydride having 4 to 5 carbon atoms or saturated dicarboxylic acid having 3 to 12 carbon atoms, or a mixture of both, in an amount sufficient to esterify about 5% to 55% of the hydroxyl groups of the alcohol. The ability of the polymerizable films prepared from the polymerizable acrylic ester to wet metal substrates is materially improved by coesterifying the polyhydric alcohol with the dicarboxylic acid. Examples of alpha-unsaturated alpha,beta-dicarboxylic acids or anhydrides which may be used in the practice of the present invention include maleic acid or anhydride, fumaric acid, itaconic acid or anhydride, mesaconic acid, and the like. Suitable examples of saturated aliphatic dicarboxylic acids which may be employed in the coesterification reaction include malonic, succinic, adipic, suberic, azelaic, sebacic, pimelic and glutaric.

The polymerizable acrylic esters of the present invention are prepared by admixing the polyhydric alcohol with the acrylic acid and dicarboxylic acid and a small amount, e.g., 0.5% to 1.5% by weight of the reaction medium of a condensation catalyst, such as hydroquinone- 2,5-disulfonic acid, sulfuric acid, p-toluenesulfonic acid, and then heating the mixture at 50° to 120° C. for about 2 to 15 hours. Preferably, the reaction is carried out under reflux conditions (at either atmospheric or reduced pressure) so that water may be removed from the reaction system by azeotropic distillation. The reaction is continued so long as water of reaction is evolved. After the completion of this reaction, the catalyst is removed using conventional separation techniques. The polymerizable acrylic ester reaction product is generally a pale to colorless, viscous, liquid.

To effect polymerization of the polymerizable acrylic ester, a film of the ester is irradiated for a period of 1 to 3 seconds or more, with ultra-violet light emitted from an artificial source having a wavelength in the range between 4000 A. and 2000 A., the arradiation being of an intensity of about 2 to 10 watts/cm.$^2$ of film surface.

Medium pressure mercury vapor discharge tubes in quartz are the preferred source of ultra-violet light. Xenon tubes and low pressure mercury vapor tubes in glass, and high-pressure mercury vapor discharge tubes in quartz or glass may be employed if desired.

As regards any particular conditions of source and distance, the duration of the irradiation treatment can be determined by a few trials.

In coating metal substrates, in accordance with the process of the present invention, the polymerizable acrylic ester is applied to the substrate in the form of a liquid in any convenient manner, as by spraying, dipping, roll coating, gravure coating or the like.

The polymerizable esters used in the practice of the present invention may also contain pigments, fillers, dyes, and the like, provided that these materials do not affect or prevent the polymerization of the ester contained in these mixtures.

In coating metal surfaces in accordance with the process of the present invention, a thin film of the polymerizable acrylic ester is applied on the metal substrate, generally in the form of a sheet which is positioned to travel on a conveyor and pass under the source of ultra-violet light. In most instances, the ultra-violet light source is maintained at about 0.25 to about 2 inches from the substrate undergoing irradiation, but this is not especially critical.

The preferred coating weight for coating metal sheet substrates with an adequately protective organic coating suitable for use in container manufacture is in the range of 2.5 to 15.0 milligrams of polymerized coating per square inch of substrate surface. To obtain these coating weights, the liquid polymerizable ester is applied at a coating thickness of about 0.1 to about 2 mils, which thickness is adequate to permit penetration by the ultra-violet light to effect the polymerization of ester.

The present invention is illustrated, but not limited, by the following example.

EXAMPLE

A polymerizable acrylic ester was prepared by the following procedure:

To a 1000 ml. round-bottom flask, equipped with a Barrett water test distilling trap, a condenser, stirrer, thermometer, and nitrogen inlet tube was charged the following reactants:

| | Grams |
|---|---|
| Glycerine (95%) | 97 |
| Glacial acrylic acid | 144 |
| Maleic anhydride | 39.2 |
| p-Toluenesulfonic acid | 4.2 |
| Hydroquinone | 4.3 |

Toluene—100 mls.

The temperature of the reaction mixture was raised to 105° to 110° C. and the mixture was heated for 9 hours under nitrogen atmosphere. The effluent water (34 grams) was removed by azeotropic distillation. After completion of the esterification reaction, the toluene was decanted and the reaction mixture was diluted with methylene chloride and subsequently washed with water to remove the free acids. 0.003 grams of hydroquinone was added as a stabilizer and the reaction mixture was stripped of solvent and dried.

To a 5 x 3 inch steel plate was applied 0.5 ml. thick film of the polymeriable ester prepared above. The coated plate was placed on a continuously moving conveyor whose speed could be adjusted so as to control the time of the irradiation under a stationary, 1200-watt ultra-violet bulb (General Electric Co. Hanovia LL Cat. No. 189A) which had an intensity of 4.35 watts/cm.$^2$ of film surface. The conveyor was adjusted so that the coated plate traveled 0.75 inch under the surface of the ultra-violet bulb. The time of irradiation and the properties of the polymerized acrylic ester coating are summarized in the table below, as well as a number of other related coatings prepared from polymerizable acrylic esters prepared in accordance with the procedure of the example.

For purposes of contrast, unsaturated polymerizable acrylic esters which are outside the scope of the present invention were prepared and irradiated following the procedure of the example. The properties of these irradiated films are also summarized in the table below. These comparative esters are designated in the table by the symbol C.

In Run Nos. $C_1$ and $C_2$ listed in the table, a polyhydric alcohol having hydroxyl groups on non-adjacent carbon atoms was substituted for a polyhydric alcohol having hydrozxyl groups on adjacent carbon atoms. In Run Nos. $C_3$ to $C_6$, a saturated monocarboxylic acid or an aromatic dicarboxylic acid was used instead of saturated aliphatic dicarboxylic acid. In Run No. $C_7$, an unsaturated monocarboxylic acid was used instead of an unsaturated dicarboxylic acid. In Run No. $C_8$, methacrylic acid was used instead of acrylic acid, and in Run No. $C_9$, a polyhydric alcohol having less than 3 hydroxyl groups was used.

TABLE

| Run No. | Polymerizable ester | Time of irradiation, seconds | Film properties after irradiation: Solvent resistance[1] | Physical appearance |
|---|---|---|---|---|
| 1 | Glycerine diacrylate maleate | 2 | Insoluble | Hard, clear, colorless. |
| 2 | Glycerine diacrylate succinate | 2 | do | Do. |
| 3 | Glycerine diacrylate azelate | 2 | do | Do. |
| 4 | Sorbitol tetraacrylate adipate | 2 | do | Do. |
| 5 | Sorbitol tetraacrylate succinate | 2 | do | Do. |
| 6 | Sorbitol tetraacrylate azelate | 2 | do | Do. |
| 7 | Mannitol tetraacrylate azelate | 4 | do | Do. |
| $C_1$ | Trimethylolpropane diacrylate azelate | 2–30 | Softens | Soft, tacky. |
| $C_2$ | Pentaerythritol diacrylate azelate oleate | 2–30 | Soluble | Oil. |
| $C_3$ | Glycerine diacrylate octonate | 2–30 | do | Oil. |
| $C_4$ | Sorbitol tetraacrylate pelargonate | 2–30 | do | Oil. |
| $C_5$ | Glycerine diacrylate propionate | 2–30 | do | Oil. |
| $C_6$ | Glycerine diacrylate phthalate | 2–30 | Insoluble | Tacky, solid. |
| $C_7$ | Glycerine diacrylate oleate | 2–30 | Soluble | Oil. |
| $C_8$ | Glycerine dimethacrylate azelate | 2–30 | do | Oil. |
| $C_9$ | Ethylene glycol diacrylate | 2–30 | do | Oil. |

[1] The coated sheet is contacted with methyl ethyl ketone solvent to determine whether the polymerized coating softens or can be removed by the solvent.

The data in the table indicate that polymerizable acrylic esters prepared by the esterification of a polyhydric alcohol having at least 3 hydroxyl groups on adjacent carbon atoms with acrylic acid and an alpha-unsaturated alpha, beta dicarboxylic acid (Run No. 1) or a saturated aliphatic dicarboxylic acid (Run Nos. 2–6) cures rapidly under ultra-violet light (in 2 to 4 seconds) to hard, adherent solvent-resistant coatings.

By way of contrast, in all the contrasting examples, $C_1$ through $C_9$, even after 30 seconds of ultra-violet exposure, these polymerizable acrylic esters outside the scope of the present invention, either remained an oil or cured to soft, tacky coatings which are relatively useless as coating materials.

By way of further contrast, glycerine diacrylate was prepared and coated on a metal sheet following the procedure of the above example. Although the coating cured rapidly (in 2 seconds), there was poor wetting of the metal surface, with the result that the cured coating was non-uniformly adherent to the metal surface.

What is claimed is:

1. A process for coating an article comprising the steps of:

applying to the surface of the article to be coated a thin film of a polymerizable ester prepared by the co-esterification of a polyhydric alcohol having at least 3 esterifiable hydroxyl groups on adjacent carbon atoms with acrylic acid and a dicarboxylic acid selected from the group consisting of saturated aliphatic dicarboxylic acids having 3 to 12 carbon atoms and an alpha-unsaturated alpha,beta unsaturated dicarboxylic acid and anhydride having 4 to 5 carbon atoms, from 45% to 95% of the hydroxyl groups being esterified with the acrylic acid; and 5% to 55% of the hydroxyl groups being esterified with the dicarboxylic acid; and exposing the film containing surface to a source of ultraviolet light for a time sufficient to effect polymerization of the ester film to obtain the coated article.

2. The process of claim 1 wherein the ester film is polymerized with a source of ultra-violet light at a dose rate of from 2 to 10 watts/cm.$^2$ of film surface.

3. The process of claim 1 wherein the film thickness of the ester ranges from 0.1 to 2 mils.

4. The process of claim 1 wherein the polyhydric alcohol is glycerine.

5. The process of claim 1 wherein the polyhydric alcohol is sorbitol.

6. The process of claim 1 wherein the polyhydric alcohol is mannitol.

7. The process of claim 1 wherein the dicarboxylic acid is adipic acid.

8. The process of claim 1 wherein the dicarboxylic acid is succinic acid.

9. The process of claim 1 wherein the dicarboxylic acid is azelaic acid.

10. The process of claim 1 wherein the dicarboxylic anhydride is maleic anhydride.

References Cited

UNITED STATES PATENTS

| | | | |
|---|---|---|---|
| 1,975,246 | 10/1934 | Zwilgmeyer | 260—76 |
| 2,028,908 | 1/1936 | Hoffman | 260—76 |
| 2,028,914 | 1/1936 | Noyes et al. | 260—76 |
| 3,392,051 | 7/1968 | Caswell et al. | 117—93.31X |
| 3,455,801 | 7/1969 | D'Alelio | 204—159.19 |

ALFRED L. LEAVITT, Primary Examiner

J. H. NEWSOME, Assistant Examiner

U.S. Cl. X.R.

117—161; 204—159.19; 260—76